United States Patent [19]
Garrido et al.

[11] Patent Number: 5,145,035
[45] Date of Patent: Sep. 8, 1992

[54] ELEVATOR DISC BRAKE

[75] Inventors: Alphonso Garrido, Madrid; Antonio Sanchez, Fuenlabrada; Jose M. Sandoval, Leganes; Jose Sevilleja, Madrid, all of Spain

[73] Assignee: Otis Elevator Company, Farmington, Conn.

[21] Appl. No.: 685,390

[22] Filed: Apr. 15, 1991

[51] Int. Cl.⁵ .................................. B66B 11/04
[52] U.S. Cl. .......................... 187/20; 187/78; 188/171
[58] Field of Search ............ 187/20, 78, 77, 23, 187/38; 188/171

[56] References Cited

U.S. PATENT DOCUMENTS

| | | | |
|---|---|---|---|
| 4,049,089 | 9/1977 | Rundle | 188/171 |
| 4,142,610 | 3/1979 | Alexander | 188/171 |
| 4,433,755 | 2/1984 | Ohtomi | 187/20 |
| 4,966,255 | 10/1990 | Fossum | 188/171 |

FOREIGN PATENT DOCUMENTS 236189 9/1989 Japan ............................ 187/20

Primary Examiner—D. Glenn Dayoan
Assistant Examiner—Kenneth Noland
Attorney, Agent, or Firm—Lloyd D. Doigan

[57] ABSTRACT

An elevator disc brake is rigidly attached to a shaft attaching to an elevator sheave. The disc brake includes a rotating disc and a non-rotating plate, the plate being driven towards the disc by a plurality of springs and moved away from the disc an electromagnet. Gaps between the plate and the disc and between the electromagnet and the plate are readily adjustable an adjustable spring seat.

5 Claims, 1 Drawing Sheet

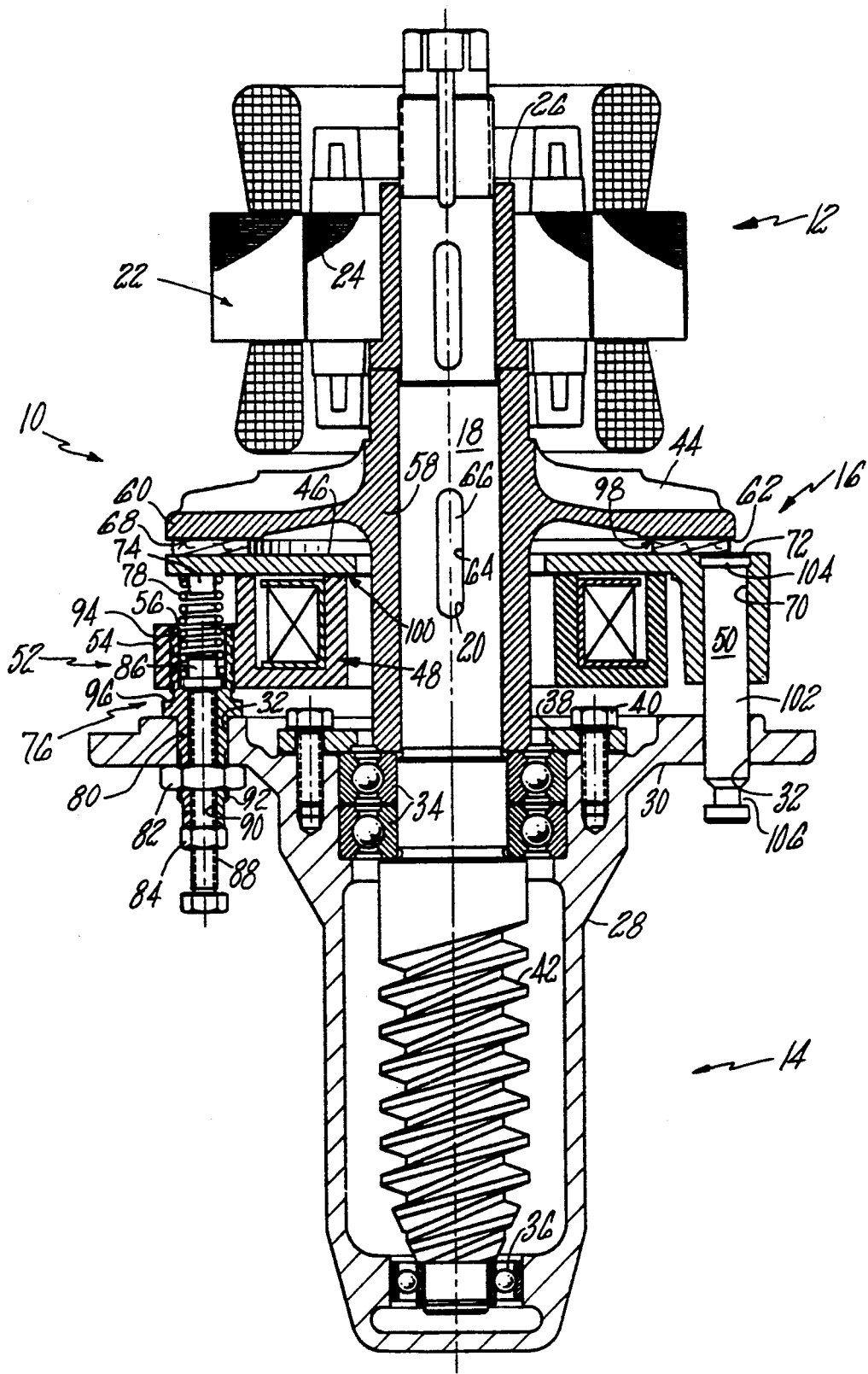

ELEVATOR DISC BRAKE

DESCRIPTION

1. Technical Field

This invention relates to elevators, and more particularly to a disc brake for use therewith.

2. Background Of The Invention

Some elevators have a rope which attaches at one end to an elevator car, extends over a sheave disposed atop an elevator hoistway, and attaches at a second end thereof to a counterweight. In some elevator systems, the sheave is driven by a motor. The elevator car is raised or lowered by means of traction developed between the rope and the driven sheave.

It is important to brake the movement of the car to register a car with a floor, as required, and for safety purposes. A brake may be attached to the motor to effectuate such control.

Some motors utilize a brake drum and a pair of brake shoes. The brake shoes create friction with the drum thereby providing the braking force necessary to stop the sheave. Each shoe attaches to a first end of a lever, the lever being mounted upon a pivot. The second end of each lever reacts to spring and electromechanical forces to activate and release the brake by pivoting the brake shoes into and out of contact with the brake drum, as is known in the art.

Drum brakes have several problems. In order to have sufficient area to create the friction forces necessary to stop the car, the brake drum may be have significant mass. Such drums may have a high moment of inertia thereby requiring more energy from the traction motor to accelerate and decelerate the car. Further, if one of the pivots holding the levers breaks, the drum brake may be rendered inoperative. The pivot arms also require a lot of space.

Some elevators are known to utilize a disc brake. The motor shaft has a splined end upon which a brake disc is mounted for rotation therewith. The disc is disposed between a stationary plate and counterplate. The plate moves axially towards the disc by means of a spring and away from the disc by means of an electromagnet. To actuate the brake, the electromagnet is turned off and the springs push the plate towards the counterplate. As the plate engages the disc, the disc moves axially along the splines towards the counterplate. The splines allow the disc to center itself between the plate and counterplate to develop friction forces between the disc and the plate and counterplate.

This type of disc brake has several problems. The coupling between the brake disc and the shaft should be tight to permit the brake disc to rotate with the shaft with a minimum of wear. However, the brake disc must be free to move axially to center between the plate and the counterplate. The relatively loose connection required for free axial movement creates noise which is undesirable. Further, this type of brake is normally added on to the end of the rotating shaft of the motor. This requires more space which is undesirable.

DISCLOSURE OF THE INVENTION

It is an object of the invention to provide a brake for an elevator which utilizes a minimum of space.

It is a further object of the invention to provide a reliable brake having a minimum of mass.

It is a further object of the invention to have a quiet brake.

According to the invention, a disc brake is rigidly attached to a shaft attaching to an elevator sheave. A disc brake comprises a rotating disc and a non-rotating plate, the plate being driven towards the disc by a plurality of springs and moved away from the disc by means of an electromagnet. Gaps between the plate and the disc and between the electromagnet and the plate are readily adjustable by means of an adjustable spring seat.

According to a further feature of the invention, the plate is guided towards and away from the disc by a plurality of jack screws which ensure proper axial movement of the plate and allow the disc brake to be disengaged in an emergency.

These and other objects, features, and advantages of the present invention will become more apparent in light of the following detailed description of a best mode embodiment thereof, as illustrated in the accompanying drawing.

BRIEF DESCRIPTION OF THE DRAWING

The Figure is a cross sectional, broken away, view of an embodiment of disc brake of the invention.

BEST MODE FOR CARRYING OUT THE INVENTION

Referring to the Figure, an embodiment of a disc brake used in an elevator drive system 10 is shown. The drive system 10 has three major sections: a motor 12, a gear box 14 and a disc brake 16 disposed between the motor and the gear box. A shaft 18 extends from the motor through the disc brake to the gear box. The shaft has an opening 20 disposed therein, as will be discussed, infra.

THE MOTOR

As is known in the art, the motor comprises a stator 22, and a rotor 24. The rotor has a central opening through which the shaft extends. The rotor is fixedly attached to the shaft 18 by means of a sleeve 26. The particular construction of the motor does not form a portion of this invention.

THE GEARBOX

The gear box 14 comprises: a housing 28 having an axial flange 30, the flange having a plurality of axial openings 32 passing therethrough; a plurality of bearings 34, 36 for allowing the free rotation of the shaft 18; an annulus 38 which seats the bearings 34 within the gear housing, the annulus being anchored to the housing by means of bolts 40, and gears (as represented by the helical screw 42 shown) as is known in the art.

THE DISC BRAKE

The disc brake 16 comprises: a disc 44 which rotates the shaft 18; a non-rotating brake plate 46; an annular, stationary electromagnet 48 having a square cross-section, the electromagnet encircling the shaft and interacting with the plate 46; a pair of rods 50 (one of which is shown for ease of illustration) for guiding the plate, the rods being disposed concentrically around the flange 30; and a plurality of spring assemblies 52 (three are desirable, one is shown for ease of illustration) for urging the plate into contact with the disc. The electromagnet 48 has three lugs 54 (one is shown for ease of illustration) having an interior threaded opening 56 as will be discussed infra.

The disc 44 comprises a cylindrical body 58 having a radially extending flange 60. The flange has a flat annular portion 62 for engaging the plate 46 as will be discussed infra. The body 58 mates with the shaft and has a slot 64 which aligns with the opening 20 in the shaft 18. The shaft is attached to the shaft by; aligning the slot 64 and the opening 20, and inserting a close fitting key 66 through the slot and the second opening.

The plate 46 encircles the body 58 of the disc and is free to move coaxially therealong. The plate has an appropriate brake lining material 68 bonded thereto as is known in the art. The brake lining material aligns with the flat annular portion 62 of the flange 60. The plate has a pair of openings 70 (one of which is shown for ease of illustration), each opening having a countersunk portion 72, as will be discussed infra.

The spring assembly 52 comprises a first spring seat 74 fixedly attached to the plate 46, an adjustable spring seat assembly 76, and a spring 78.

The adjustable spring seat assembly includes a bushing 80 which extends through one of the openings 32 in the housing 28, a first locking nut 82, a second locking nut 84, a second spring seat 86, and a threaded bolt 88, the bolt attaching to the second spring seat 86. The bushing 80 has an internal threaded portion 90 for cooperating with the threaded bolt, a first external threaded portion 92 for cooperating with the first locking nut 82, a second external threaded portion 94 for cooperating with the lugs 54 attaching to the electromagnet, and an annular shoulder 96.

The spring seat assembly is assembled as follows: the bolt 88 is threaded through the internally threaded portion of the bushing 90; the bolt is then attached to the second spring seat 86 by conventional means; the bushing is then inserted into one of the openings 32 in the housing flange 30; the second threaded portion 94 of the bushing is screwed into the threaded opening 56 in the lugs 54 to attach the electromagnet 48 thereto; the bushing may be rotated to adjust the gap 98 between the electromagnet and the disc; the first locking nut 82 is then threaded upon the first external threaded portion 92 of the bushing and tightened until the shoulder 96 of the bushing abuts the gearbox flange 30; the spring 78 is fitted between the first and second spring seats 74, 86; the bolt is then rotated within the bushing to set the air gap 100 between the plate and the electromagnet; and, finally, the locking nut 84 is threaded over the bolt to prevent the bolt from moving after the gap 98 has been adjusted.

The rods 50 are arranged disposed within the gear box flange openings 32 at 180° from each other. Each rod has a cylindrical body 102 having an area of increased diameter 104 and an area of decreased diameter 106. The area of increased diameter is seated within the countersunk portion 72 of the plate 46. The area of decreased diameter is disposed on the gearbox side of the flange. As may be required, a service person may insert a tool (not shown) into the area of reduced diameter to pull the plate, via the seating of the area of increased diameter in the countersunk portion, away form the disc.

Although the invention has been shown and described with respect to a best mode embodiment thereof, it should be understood by those skilled in the art that the foregoing and various other changes, omissions, and additions in the form and detail thereof, may be made therein without departing from the spirit and scope of the invention.

We claim:

1. An elevator disc brake for use with a shaft which rotates as the elevator is raised or lowered, said elevator disc brake comprising:
   a non-rotating housing,
   a disc securely fastened to said shaft and rotating therewith,
   a non-rotating plate for cooperating with said disc to create sufficient friction to brake the rotation of said shaft,
   a guide means for guiding said plate into and out of contact with said disc, said guide means attaching to said housing such that said guide means is free to move coaxially with said shaft,
   spring means for urging said plate into contact with said disc, said spring means being attached to said housing; and,
   an electromagnet encircling said shaft and attaching to said spring means, said electromagnet urging said plate out of contact with said disc when activated.

2. The elevator disc brake of claim 1 wherein said spring means further comprises:
   means for adjusting an air gap between said plate and said electromagnet.

3. The elevator disc brake of claim 1 wherein said spring means further comprises:
   means for adjusting an air gap between said disc and said electromagnet.

4. The elevator disc brake of claim 1 wherein said guide means further comprises:
   means for attaching said guide means to said plate to disengage said plate from said disc, and
   means for grasping and pulling said guide means for disengaging said plate from said disc.

5. The elevator disc brake of claim 1 wherein said housing further comprises:
   a gearbox housing.

* * * * *